US012067251B2

(12) United States Patent
Alshawabkeh et al.

(10) Patent No.: US 12,067,251 B2
(45) Date of Patent: Aug. 20, 2024

(54) DATA AUTOMATION AND PREDICTIVE MODELING FOR PLANNING AND PROCURING SOLID STATE DRIVE REPLACEMENTS

(71) Applicant: Dell Products, L.P., Hopkinton, MA (US)

(72) Inventors: Malak Alshawabkeh, Franklin, MA (US); Sunil Gumaste, Bengaluru (IN); Ravish Sachdeva, Jammu (IN); Pankaj Soni, Sikar (IN); Christopher Allison, Milford, MA (US)

(73) Assignee: Dell Products, L.P., Hopkinton, MA (US)

( * ) Notice: Subject to any disclaimer, the term of this patent is extended or adjusted under 35 U.S.C. 154(b) by 73 days.

(21) Appl. No.: 17/717,208

(22) Filed: Apr. 11, 2022

(65) Prior Publication Data

US 2023/0325092 A1 Oct. 12, 2023

(51) Int. Cl.
*G06F 3/06* (2006.01)
(52) U.S. Cl.
CPC .......... *G06F 3/0616* (2013.01); *G06F 3/0653* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 9,703,664 B1 * | 7/2017 | Alshawabkeh | G06F 3/067 |
| 11,487,273 B1 * | 11/2022 | Zhao | G05B 19/41885 |
| 2010/0271956 A1 * | 10/2010 | Diwakar | G06F 11/3452 370/242 |
| 2018/0039555 A1 * | 2/2018 | Salunke | G06F 11/3006 |
| 2021/0034278 A1 * | 2/2021 | Kaushik | G06F 3/0634 |
| 2021/0064431 A1 * | 3/2021 | Smith | G06F 9/542 |
| 2022/0164660 A1 * | 5/2022 | Fietzek | G06N 3/08 |

* cited by examiner

*Primary Examiner* — Yaima Rigol
*Assistant Examiner* — Alexander J Yoon
(74) *Attorney, Agent, or Firm* — Anderson Gorecki LLP

(57) ABSTRACT

A method of predicting usage levels of solid-state drives (SSDS) includes receiving time series usage data from each SSD over a plurality of monitoring intervals (lags), and using a first portion of the time series usage data to train (fit) an ARIMA model to the time series data. A unique ARIMA model (order) is determined for each SSD from the unique time series % usage data of each SSD. The ARMA model is then fit to the time series % usage data and used in a predictive manner to predict a future date when the % usage will exceed a threshold % usage value. By predicting when the SSDs will meet particular thresholds, it is possible to plan for and procure replacement SSDs to enable currently installed SSDs to be removed from service before the currently installed SSD % usage levels exceed threshold values, thus enabling the currently installed SSDs to be repurposed.

20 Claims, 11 Drawing Sheets

FIG. 6

Auto Regression Integrated Moving Average (ARIMA) 215

$$Y_t = \alpha + \beta_1 Y_{t-1} + \beta_2 Y_{t-2} + \ldots + \beta_p Y_{t-p} + \varepsilon_t + \varphi_1 \varepsilon_{t-1} + \varphi_2 \varepsilon_{t-2} + \ldots + \varphi_q \varepsilon_{t-q}$$

ARIMA(p,d,q)
p: Order of AR term (number of lags)
d: Order of I term (number of differences)
q: Order of MA term (number of error terms)
$Y_t$ = : predicted value
$\alpha$ : constant
$\beta_1, \beta_2 \ldots \beta_p$ : learned coefficients
$Y_{t-1}, Y_{t-2}, \ldots Y_{t-p}$ : differences between values at previous lags
$\varepsilon_t, \varepsilon_{t-1}, \varepsilon_{t-2} \ldots \varepsilon_{t-q}$: error values at previous lags
$\varphi_1, \varphi_2, \ldots \varphi_q$: learned coefficients

FIG. 7

ARIMA Forecasting Data Structure 325

| SSD-ID | ARIMA Model (p, d, q) | ARIMA Learned coefficients | Lagged values | Error values | Current %Usage | Prediction/ forecast |
|---|---|---|---|---|---|---|
| 0 | (14,1,1) | $\beta_1, \beta_2 \ldots \beta_{14}$ $\varphi_1$ | $Y_{t-1}, Y_{t-2}, \ldots Y_{t-14}$ | $\varepsilon_t, \varepsilon_{t-1}$ | 5% | 14 days |
| 1 | (10,2,1) | $\beta_1, \beta_2 \ldots \beta_{10}$ $\varphi_1$ | $Y_{t-1}, Y_{t-2}, \ldots Y_{t-10}$ | $\varepsilon_t, \varepsilon_{t-1}$ | 4% | 15 days |
| 2 | (12,1,2) | $\beta_1, \beta_2 \ldots \beta_{12}$ $\varphi_1, \varphi_2$ | $Y_{t-1}, Y_{t-2}, \ldots Y_{t-12}$ | $\varepsilon_t, \varepsilon_{t-1}, \varepsilon_{t-2}$ | 8% | 2 days |
| ... | ... | ... | ... | ... | ... | ... |
| 102254 | (8,2,3) | $\beta_1, \beta_2 \ldots \beta_8$ $\varphi_1, \varphi_2, \varphi_3$ | $Y_{t-1}, Y_{t-2}, \ldots Y_{t-8}$ | $\varepsilon_t, \varepsilon_{t-1}, \varepsilon_{t-2}, \varepsilon_{t-3}$ | 3% | 32 days |

DATA AUTOMATION AND PREDICTIVE MODELING FOR PLANNING AND PROCURING SOLID STATE DRIVE REPLACEMENTS

FIELD

This disclosure relates to computing systems and related devices and methods, and, more particularly, to data automation and predictive modeling for planning and procuring solid state drive replacements.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a method of predicting usage levels of solid-state drives (SSDs) includes receiving time series usage data from each SSD over a plurality of monitoring intervals (lags), and using a first portion of the time series usage data to train (fit) an ARIMA model to the time series data. In some embodiments, a unique ARIMA model is fit to the unique time series data of each SSD. The ARMIA model is then tested using a second portion of the time series data, and the trained and tested ARIMA model is used to uniquely predict when the SSD will exceed particular usage thresholds. By creating and training a separate ARIMA model for each of the SSDs, it is possible to account for individual work patterns on each of the SSDs, and the differences in manufacturing characteristics of each of the SSDs, to accurately predict (forecast) on an individualized basis when usage levels of each of the SSDs will exceed particular thresholds. By predicting when the SSDs will meet particular thresholds, it is possible to plan for and procure replacement SSDs to enable currently installed SSDs to be removed from service before currently installed SSD % usage levels exceed threshold values, thus enabling the currently installed SSDs to be repurposed.

BRIEF DESCRIPTION OF THE DRAWINGS

FIG. 6 is a functional block diagram of an example Auto Regression Integrated Moving Average (ARIMA) model, according to some embodiments.

FIG. 7 is a functional block diagram of an ARIMA forecasting data structure, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
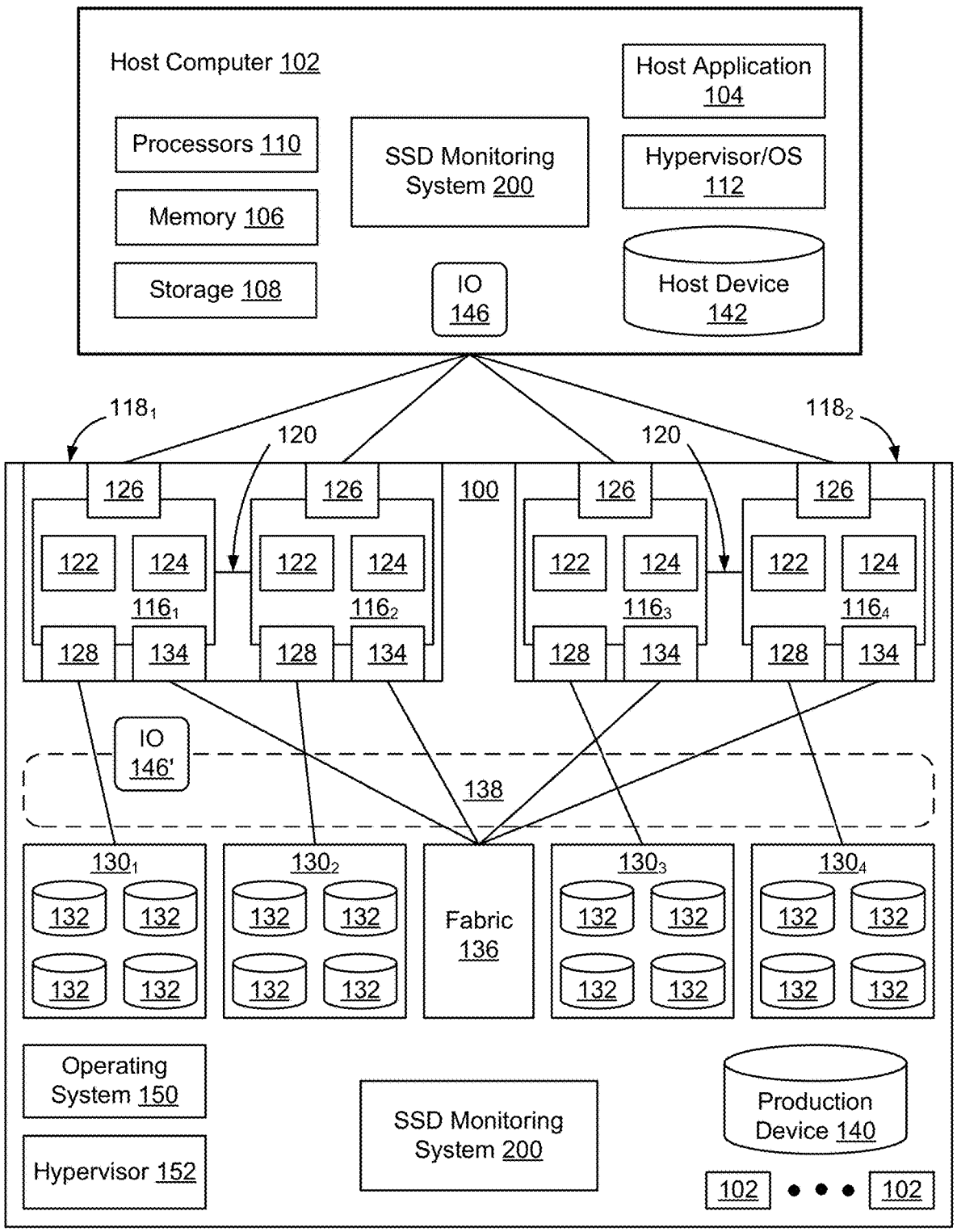
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g., ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g., ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g., one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes 116$_1$-116$_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. The host computer 102 can then execute read/write IOs on the TDev to access the data of the production device 140.

As noted above, in some embodiments, managed drives 132 are implemented using solid state drives. Solid State Drives (SSDs) have a lifespan that is specified in terms of program/erase cycles. A given SSD is designed to endure a maximum number of physical program/erase cycles, after which the SSD may cease operation. Self-Monitoring, Analysis, and Reporting Technology (S.M.A.R.T.) is a monitoring system included in many computer hard disc drives, solid state drives (SSDs), and other drives such as embedded Multi-Media Card (eMMC) storage. The primary purpose of the S.M.A.R.T. monitoring system is to detect and report various indicators of drive reliability, to enable the drives to be monitored to anticipate imminent hardware failures. For example, in some implementations, the S.M.A.R.T. monitoring system enables a SSD to report the life left (parameter 230: 0xE7) which indicates the approximate % usage SSD life left, in terms of program/erase cycles. A normalized value of 100 represents a new drive, whereas a value of 10 would indicate that the drive has 10% expected remaining program/erase cycles prior to failure. A value of 0 may mean that the drive is operating in read-only mode to allow data recovery. Another S.M.A.R.T. parameter that can be used to determine the health of an SSD is the endurance remaining (parameter 232: 0xE8) which identifies the number of physical erase cycles completed on the SSD as a percentage of the maximum physical erase cycles the drive is designed to endure.

While the S.M.A.R.T. monitoring system provides useful information that enables SSDs to be monitored, particularly when the SSDs are nearing the end of their life, there are other situations where accurate SSD usage forecasts are required, to enable a prediction to be generated as to when each of the SSDs of a storage system or of a set of storage systems is expected to exceed a particular usage threshold.

For example, there are some situations where it would be advantageous to use an SSD for a short period of time, and then repurpose the SSD before the usage level of the SSD has exceeded a particular low threshold. For example, a set of storage systems may be provided with a large number of SSDs, and a series of tests may be run on the storage systems. An example testing scenario might include testing a new storage product that is being developed to enable new functionality to be implemented on the set of storage systems. After implementing the series of tests, it may be advantageous to repurpose the SSDs for example by moving the SSDs from the set of storage systems to other storage systems. However, if the useful life of the SSDS has been reduced below a threshold percentage such as 5% or 10%, repurposing the SSDs may not be practicable. By predicting when the SSDs will meet particular thresholds, it is possible to plan for and procure replacement SSDs to enable currently installed SSDs to be removed from service before the currently installed SSD % usage levels exceed threshold values, thus enabling the currently installed SSDs to be repurposed.

The problem of monitoring SSD usage becomes complicated, particularly in situations where there are multiple storage systems which may be located in different data centers. Further, each storage system may have hundreds or thousands of SSDs that are physically located in separate storage arrays. The SSDs themselves, may have been made by different manufacturers and have different useful life expectations (e.g., be designed to accommodate different numbers of program/erase cycles). Finally, a given storage system may group SSDs into storage resource pools, which may cause the amount of workload on the SSDs of the storage array to vary considerably. Existing mechanisms capture drive life percentage use data on a per-drive basis, but the data captured is often incomplete and not easily translatable into a set of actionable items that can be executed to prevent SSDs from exceeding the repurpose thresholds.

Figure 2:
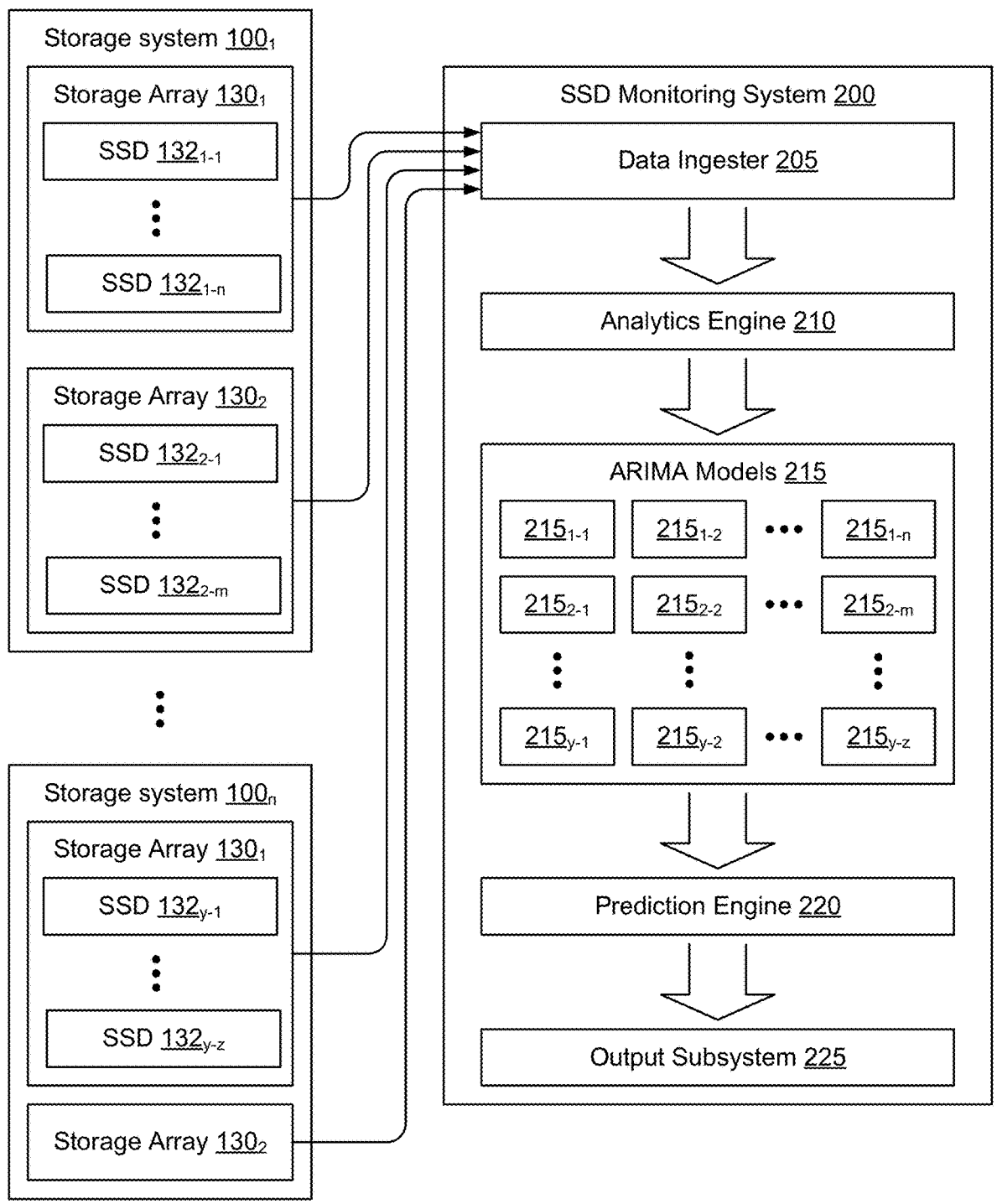
FIG. 2 is a functional block diagram of an example set of storage arrays from multiple storage systems connected to a Solid-State Drive (SSD) monitoring system, according to some embodiments.

FIG. 2 is a functional block diagram of an example set of storage arrays from multiple storage systems connected to a Solid-State Drive (SSD) monitoring system, according to some embodiments. According to some embodiments, an SSD monitoring system 200 is provided that is configured to receive SSD % usage reports from each monitored SSD 132 on each storage array 130. The monitoring system 200 includes a data ingester 205 configured to normalize data contained in the reports to populate time series usage data for each monitored SSD in a database. An analytics engine 210 builds a separate ARIMA model 215 for each SSD based on the time series % usage data for that SSD. Once the ARIMA models 215 are built, the ARIMA models 215 are used by a prediction engine 220 to forecast when each of the SSDs is expected to reach particular % usage thresholds. The forecast threshold breach determinations are provided to an output subsystem 225 to enable SSD usage reports, dashboards, and other metrics to be created, and to allow individual SSDs that are close to reaching particular usage thresholds to be identified. By building a separate ARIMA model for each SSD, it is possible to accurately predict when each SSD is expected to reach its repurposing threshold, thereby enabling the SSDs to be physically removed from the storage system and repurposed before the SSDs exceed the usage repurposing thresholds. By predicting when the % usage levels for each of the individual SSDs will meet particular thresholds, it is possible to plan for and procure replacement SSDs to enable currently installed SSDs to be removed from service before the currently installed SSD % usage levels exceed those threshold values, thus enabling the currently installed SSDs to be repurposed As shown in FIG. 1, in some embodiments a given storage system will include an SSD Monitoring system 200, for example executing in an emulation on the storage system 100. In other embodiments, the SSD monitoring system 200 may execute in host 102, for example as a host application 104. In still other embodiments, as shown in FIG. 2, the SSD monitoring system 200 may connect to multiple storage systems and operate to monitor SSDs of multiple storage arrays 130 associated with multiple storage systems 100.

Figure 3:
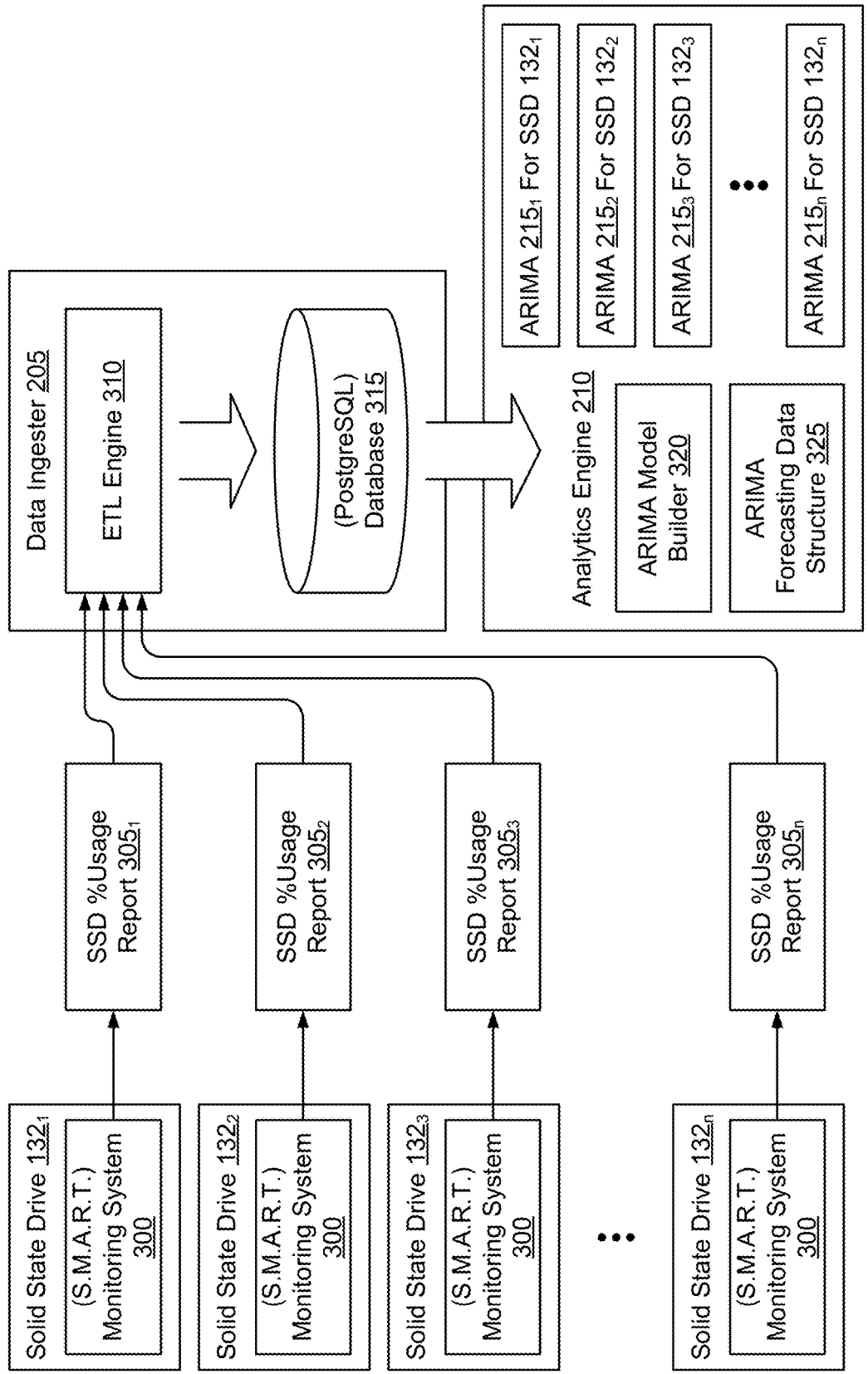
FIG. 3 is a functional block diagram of the example SSD monitoring system in greater detail, according to some embodiments.

FIG. 3 is a functional block diagram of the example SSD monitoring system in greater detail, according to some embodiments. As shown in FIG. 3, in some embodiments each SSD has a monitoring system 300 configured to provide SSD usage reports 305 to a data ingester 205 of the SSD monitoring system 200. In some embodiments, the monitoring systems 300 are S.M.A.R.T. monitoring systems and the SSD usage reports comply with the S.M.A.R.T. protocol. Other types of monitoring systems 300 may be used as well, depending on the implementation.

Figure 4:
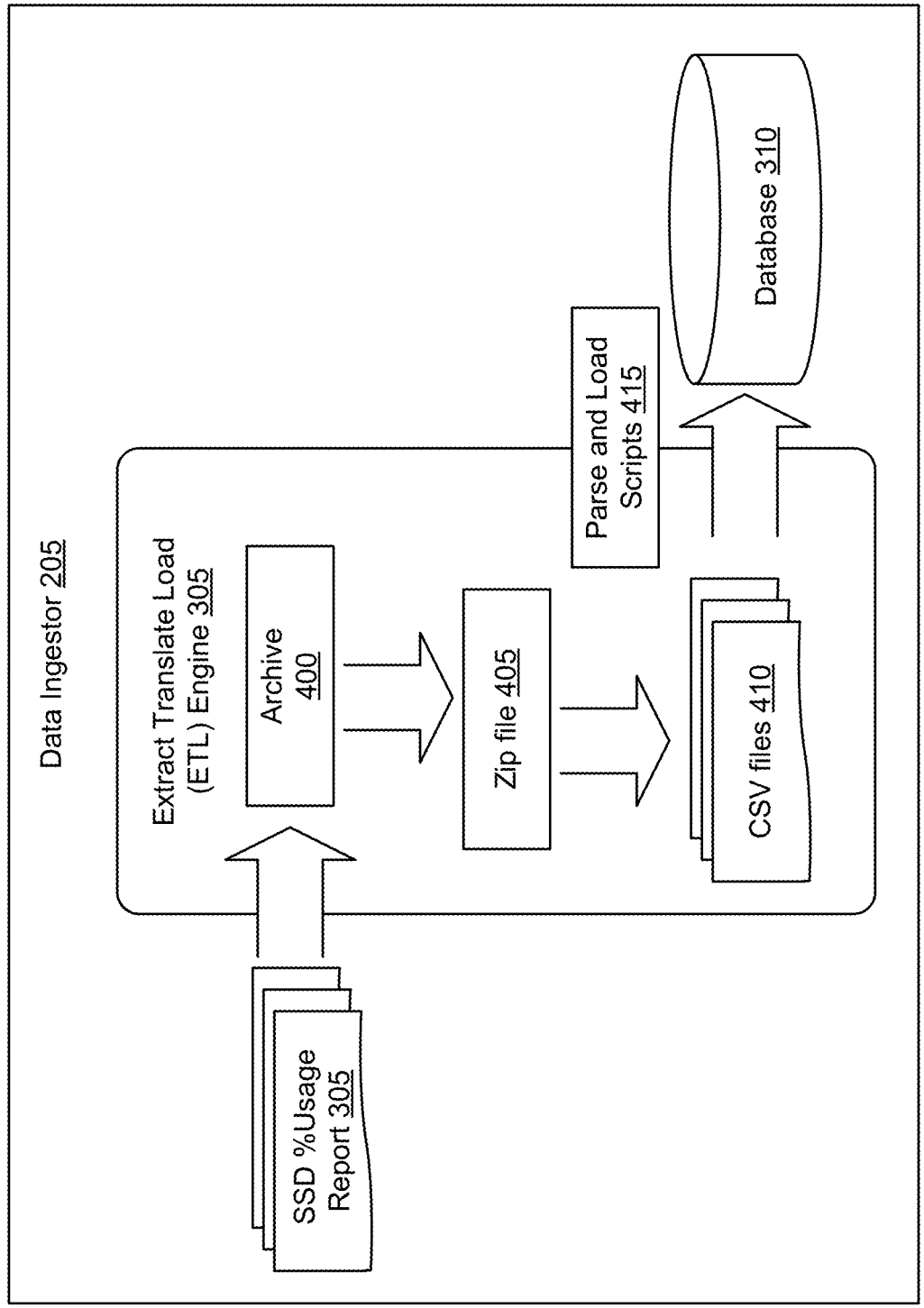
FIG. 4 is a functional block diagram showing an example data ingester of the SSD monitoring system of FIG. 2 in greater detail, according to some embodiments.

In some embodiments, the data ingester 205 includes an Extract Translate Load (ETL) engine 310 configured to provide a data processing pipeline to process uploading and handling data via automated tools. Additional details of an example ETL engine are shown in FIG. 4. The flexible and efficient ETL process ingests and loads large numbers of logs collected weekly from each of the SSDs on each of the storage arrays. ETL engine 310 extracts SSD data from the source files. For example, where the SSD usage reports 305 are SSD XML logs, the ETL engine parses the data and transforms (sorts, filters, etc.) the data into a required format for storage in a database 315. The standardized data is then loaded into a database 315. Database 315 may be implemented, for example, using a PostgreSQL database or another type of database depending on the implementation. A PostgreSQL database is an open-source object-relational database. Once the data has been loaded into the database 315, the data is able to be used by an analytics engine 210 to generate individual ARIMA models for each of the SSDs.

For example, as shown in FIG. 3, SSD $132_1$ periodically provides SSD usage reports $305_1$. The ETL engine extracts the usage information from the SSD usage reports $305_1$ into a standardized format, and stores the time series usage information in the database 315. The time series usage data for SSD $132_1$ is then used to build an ARIMA model $215_1$ for SSD $132_1$. Similarly, time series usage data is extracted from SSD usage reports $305_2$, $305_3$, ... $305_n$, stored in the database 315, and used by the analytics engine 210 to build an ARIMA model $215_2$ for SSD $132_2$, an ARIMA model $215_3$ for SSD $132_3$, ... and an ARIMA model $215_n$ for SSD $132_n$.

In some embodiments, the analytics engine 210 includes an ARIMA forecasting data structure configured to store the ARIMA parameters determined for the ARIMA models, and predictions (forecasts) derived from the ARIMA models. The predictions identify when the usage level of each of the SSDs is predicted to reach a threshold value. By predicting in advance when each of the SSDs is expected to reach a threshold value, and using a separate ARIMA model for each SSD based on the historical time-series usage data for the SSD, it is possible to take corrective action on individual SSDs to prevent the SSDs from being used in excess of the % usage threshold. By preventing the SSDs from exceeding the % usage threshold, it is possible to ensure that the SSDs are able to be repurposed. This also assists in planning for and procuring replacement SSDs.

There are a finite number of times a NAND flash cell can be written within an SSD. This usage is reported by the SSD as a percentage from 0 to 100, referred to as SSD wear % or life use %. When this usage reaches a default threshold, e.g., 5%, it triggers alerts that the SSD is at risk and needs to be considered for future activities, such as SSD rotation planning. By building a predictive modeling solution, to predict ahead-of-time when a SSD will reach a target % usage value, it is possible to proactively remove SSDs before they reach exceed the threshold, which enables optimization of SSD swap/rotation activities.

FIG. 4 is a functional block diagram showing an example data ingester 205 of the SSD monitoring system of FIG. 2 in greater detail, according to some embodiments. As shown in FIG. 4, in some embodiments SSD usage reports 305 are input to the ETL engine 305. In some embodiments, the SSD usage reports 305 are data files/SQlite DBs files that are mounted to the ETL engine using, for example, a Common Internet File System (CIFS) mount command. The ETL engine includes an archive 400 which stores the SSD usage reports 305, aggregates the SSD % usage data, and groups the SSD usage reports into ZIP files 405. The SSD % usage information contained in the ZIP file 405 is converted to Comma Separated Value (CSV) data format to create CSV files 410. Parse and load scripts 415 are used to load the CSV files to the database 310.

Figure 5:
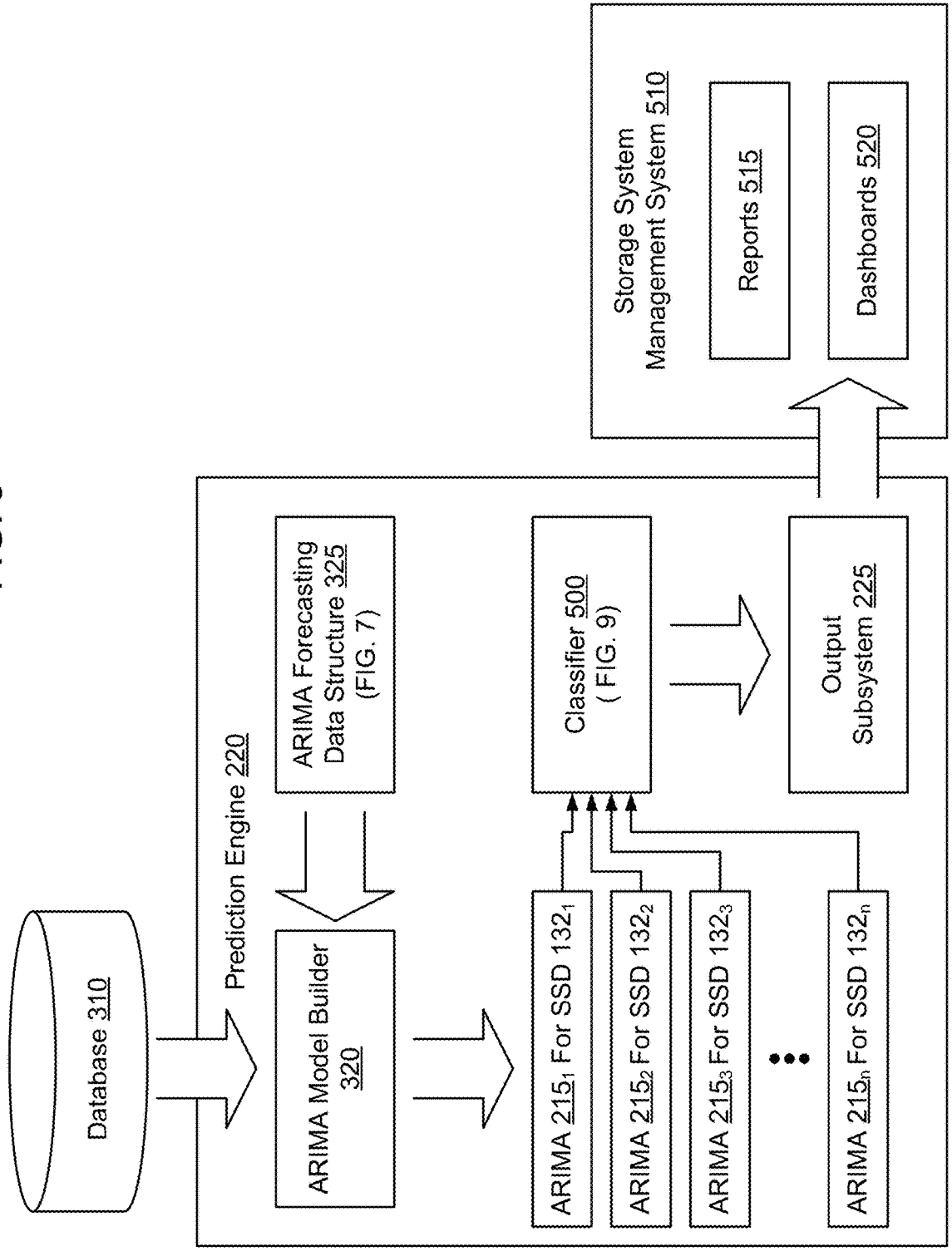
FIG. 5 is a functional block diagram showing an example prediction engine and output subsystem of the example SSD monitoring system of FIG. 2 in greater detail, according to some embodiments.

FIG. 5 is a functional block diagram showing an example prediction engine and output subsystem of the example SSD monitoring system of FIG. 2 in greater detail, according to some embodiments. As shown in FIG. 5, in some embodiments the prediction engine 220 includes an ARIMA forecasting data structure 325. An example ARIMA forecasting data structure is shown in FIG. 7. As noted above, in some embodiments the prediction engine 220 builds a separate ARIMA model 215 for each SSD. The ARIMA forecasting data structure 325 is used to store the model type (p,d,q) of each ARIMA model, the learned parameters for each ARIMA model, and sets of lagged SSD % usage values for each SSD.

As used herein, a "lag" is used to refer to a fixed amount of time. For example, a "lag" may be a five-minute interval, one hour interval, or 24-hour interval. "lags" of a given time series are always constant. Thus, a time-series will have a constant lag value such that all values of the time-series are taken at 5-minute intervals, one-hour intervals, 24-hour intervals, or based on whatever the particular "lag" value is for the particular time-series. Different ARIMA models may be based on time-series data with different lag values, but within a given time-series the lag value is constant.

When a current SSD usage report 305 is received, the prediction engine retrieves the SSD usage information in the current SSD usage report to update the ARIMA models, to generate new predictions associated with when the SSDs are expected to cross one or more % usage thresholds. A classifier 500 is then used to classify the SSDs, based on the current % usage of the SSDs and the forecast time when the SSDs are expected to cross the one or more % usage thresholds.

The prediction engine 220 also includes an output subsystem 225 which outputs information about the SSD % usage values. For example, SSD usage reports 515 and dashboards 520 may be generated based on the SSD % usage values in a system such as a storage system management system 510.

FIG. 6 is a functional block diagram of an example AutoRegressive Integrated Moving Average (ARIMA) model, according to some embodiments. In time series analysis, an autoregressive integrated moving average model is a generalization of an autoregressive moving average model. Both of these models are fitted to time-series data, either to better understand the data or to predict future points in the time-series. The AutoRegressive (AR) part of ARIMA indicates that the evolving variable of interest is regressed on its own lagged (i.e. prior) values. The Moving Average (MA) part indicates that the regression error is actually a linear combination of error terms, whose values occurred contemporaneously and at various times in the past. The Integrated (I) part indicates that the data values have been replaced with the difference between their values and the previous values. A single differencing process may be used or multiple differencing processes may be used.

The purpose of predictive analysis is to predict the SSD life use % value at any point in time, and to determine when the SSD will be in a certain state. To accomplish that, in some embodiments an ARIMA forecasting algorithm is used. ARIMA is a forecasting algorithm based on the idea that the information in the past values of the time series—its own lags and the lagged forecast errors—can be used to predict the future values as shown using the formula shown in FIG. 6. In FIG. 6, the predicted % usage value at an upcoming time Yt is equal to a constant plus a linear combination of lags of Y (up to p lags) plus a linear combination of lagged forecast errors (up to q lags). The ARIMA model is built by selecting the order of the AR term (p=number of lags), the order of the I term (d=number of differences), and the order of the MA term (q=number of lagged error terms). Once the form of the ARIMA model is selected— ARIMA(p,d,q)—the ARIMA model is fit to the time-series data to learn the β and φ coefficients.

Figure 10:
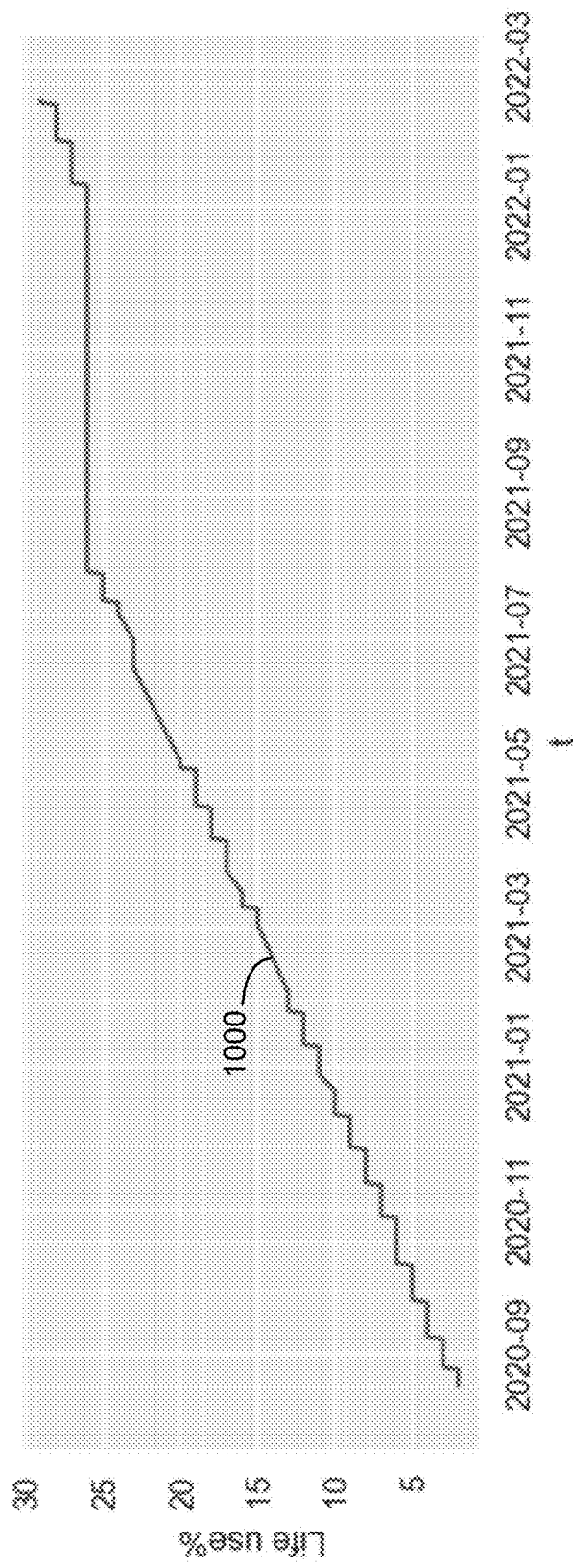
FIG. 10 is a graph showing an example plot of a particular SSD measured % usage versus time, according to some embodiments.

FIG. 10 is a graph showing an example plot of a particular SSD measured % usage versus time. As shown in FIG. 10, the time series plot 1000 shows that there is a clear upward trend in SSD % usage. This suggests that the time-series is not stationary, because the mean and variance are changing over time, thus providing a drift in the concepts a model may try to capture. Running an Augmented Dickey Fuller test (ADF) on the time series data confirms that the time series is not stationary, as the P-value is greater than a significance level of 0.05, and therefore the time-series needs to be transformed into stationary. One way to transform the time-series into stationary is to implement differencing. The value of d, therefore, is the minimum number of differencing instances needed to make the time series stationary.

Figure 11:
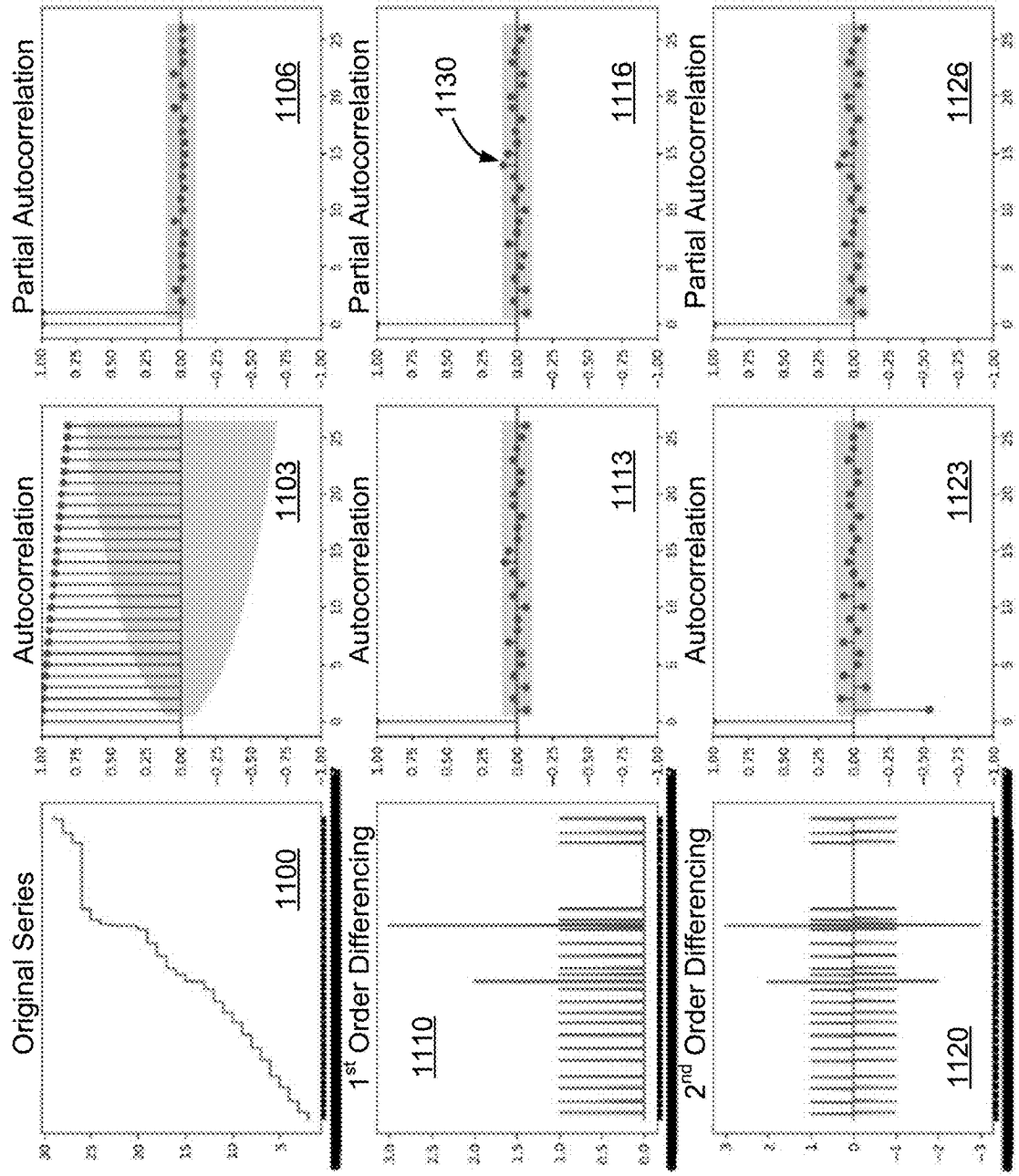
FIG. 11 is a set of graphs showing the original time series of FIG. 10, first order differencing, second order differencing, and autocorrelation and partial autocorrelation plots for each, according to some embodiments.

FIG. 11 is a series of graphs. Graph 1100 shows the original time series data, graph 1103 is a graph showing the autocorrelation of the original time-series, and graph 1106 shows the partial autocorrelation of the original time series. Graph 1110 shows a first order differencing of the original time series, graph 1113 is a graph showing the autocorrelation of the first order differencing, and graph 1116 shows the partial autocorrelation of the first order differencing. Graph 1120 shows a second order differencing of the original time series, graph 1123 is a graph showing the autocorrelation of the second order differencing, and graph 1126 shows the partial autocorrelation of the second order differencing. As shown in FIG. 11, the graph 1110 suggests that the time series becomes stationary with one order of differencing, so for this time series d=1.

An Auto Regressive (AR only) model is one where Yt depends only on its own lags—it utilizes the dependent relationship between a current life % usage observation for the SSD and observations over a previous period. Yt is a function of the lags of Yt and p is the order of the AR term, e.g., the number of previously observed values in this time series required to predict the upcoming value Yt of the time series. It is possible to find the number of required AR terms by inspecting the partial autocorrelation (PACF) plot 1116 shown in FIG. 11. Looking at the partial autocorrelation plot 1116 for the first order of differencing, it is seen that the PACF value 1130 is significant at lag 14 (exceeds a noise threshold identified by the gray bar), so for this time series an ARIMA model should be built using p=14 lags. Stated differently, based on the partial autocorrelation plot, 14 previous observations are needed to make a good prediction of Yt.

A Moving Average (MA) model is one where Yt depends only on the lagged forecast errors and q is the order of the MA term. The MA term refers to the number of lagged forecast errors that should be used in the ARIMA model. The autocorrelation plot (ACF) does not reveal a best number of MA terms, so instead a grid search approach was used to find the best q, using Akaike Information Criterion (AIC). AIC is used to estimate a relative amount of information lost by a given model, where a lower AIC value is preferred. In this instance, the lowest AIC value was obtained with q=1, so a single lagged error term was determined to be sufficient for the ARIMA model.

Based on that, an ARIMA (14, 1, 1) model was determined to be sufficient to predict Yt based on the time-series SSD % usage values shown in FIG. 10. In python, an ARMIA model can be created using the statsmodels library. The model is defined by calling ARIMA( ) and passing in the p, d, and q parameters. The model is prepared on the training data by calling the fit( ) function, and then the model can be used to predict future values using the predict( ) function, and specifying the index of the time or times to be predicted. For example, if the SSD usage data is contained in "series", and the ARIMA model to be created is ARIMA(14,1,1), the python instruction: model=ARIMA(series, order=(14,1,1)) can be used to create the ARIMA model, and the python instruction: model_fit=model.fit( ) can be used to fit the model to the SSD usage data. Other ways of creating the ARIMA model and fitting the ARIMA model to SSD usage data may be used as well, depending on the implementation.

In some embodiments, a measured time-series usage data is split into two data sets: training and testing. It is possible to train the ARIMA model on a first data set of older data, and then run the ARIMA model in a predictive manner and compare the predictive output of the ARIMA model against the actual data to determine if the ARIMA model is sufficiently accurate. If the ARIMA model is not sufficiently accurate, the ARIMA model may be adjusted, e.g., by increasing the number of lags (increasing p term) or changing the MA term (change q). As an example, if the ARIMA model is determined to be (14,1,1), and there are 20 data points in the time-series, the first 14 data points can be used to fit the ARIMA model, and then the ARIMA model can be used to predict the value of the time-series at the 15-20$^{th}$ data points. Those predictions can be compared against the actual data contained in the time-series to determine the accuracy of the ARIMA model at predicting future time-series values.

In some embodiments, an SSD is determined to be at risk when the SSD life use % is 5%, and a SSD is no longer able to be repurposed when the SSD life use % exceed 10%. Accordingly, in some embodiments, a separate ARIMA model is created for each individual SSD that is monitored by the SSD monitoring system. The ARIMA models are used to in a predictive manner to determine when each SSD is expected to pass the "at risk" 5% threshold, and when each SSD is expected to pass the 10% threshold and is no longer able to be repurposed. The classifier 500 uses the outputs of the ARIMA models to classify each of the SSDs to enable the status of the SSDs to be visualized on the storage system management system 510. Based on the SSD classification, it is possible to plan for and procure replacement SSDs FIG. 7 is a functional block diagram of an example ARIMA forecasting data structure, according to some embodiments. As shown in FIG. 7, in some embodiments an ARIMA forecasting data structure 325 includes entries (rows) for each SSD being monitored. In FIG. 7, the SSDs are identified using an SSD Identifier (SSD-ID). The ARIMA forecasting data structure 325 also includes information about the ARIMA model (the p,d,q values) that have been derived for each SSD. For example, the SSD with a SSD-ID=0 has an ARIMA(14,1,1) model, whereas the SSD with SSD-ID=1 has an ARIMA(10,2,1) model. In some embodiments, separate ARIMA model types are created for each SSD based on the process described above (and as described below in connection with FIG. 8) such that the ARIMA model is created that is most likely able to be used to accurately predict future SSD % usage values of the particular SSDs.

In some embodiments, the ARIMA forecasting data structure 325 also includes the ARIMA learned coefficients. In other embodiments, the ARIMA forecasting data structure 325 may omit the ARIMA learned coefficients, and instead fit a new ARIMA model to the lagged values during each instance where the ARIMA model is to be used in a predictive manner.

The ARIMA forecasting data structure 325 also includes a set of lagged values and a set of error values. In some embodiments, the set of lagged values is scoped to coincide with the AR term (p-value) of the ARIMA model, such that the ARIMA forecasting data structure 325 contains at least p lagged values for each SSD-ID. Thus, for example, in FIG. 7, the ARIMA forecasting data structure 325 contains 14 lagged values for the entry for SSD-ID=0, because the ARIMA model for that entry has a p term=14. Similarly, the entry for SSD-ID=1 contains 10 lagged values. In other embodiments, the ARIMA forecasting data structure may contain a much larger number of lagged values, to enable a longer time-series to be retained for each of the SSDs, which enables a more accurate ARIMA model to be created for the SSDs in the event that the current ARIMA model is determined to be insufficiently accurate in predicting future values for the time-series.

In some embodiments, as shown in FIG. 7, the ARIMA forecasting data structure 325 also includes the current % usage value and the prediction/forecast time when the SSD % usage is expected to cross an upcoming threshold. The upcoming threshold, in some embodiments, is a % usage value after which the SSD will no longer be able to be removed from its current storage array and repurposed, e.g., installed and used in another storage array, or installed and used in another storage system.

Although FIG. 7 shows an example ARIMA forecasting data structure cast in the form of a table, it should be understood that other data structure formats may be used depending on the implementation.

Figure 8:
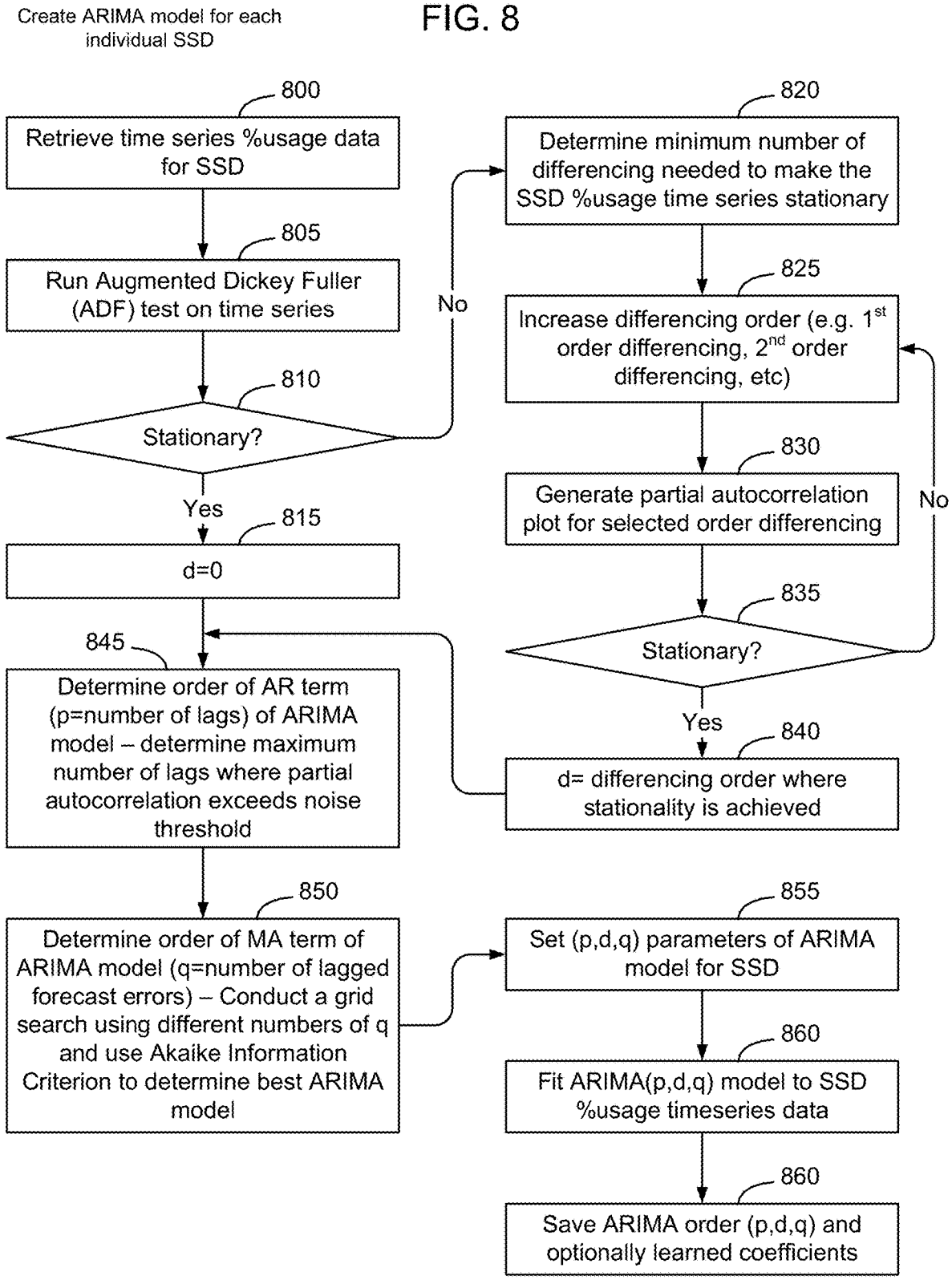
FIG. 8 is a flow chart of a process of creating an ARIMA model for an SSD according to some embodiments.

FIG. 8 is a flow chart of a process of creating an ARIMA model by the ARIMA model builder 320 for an SSD according to some embodiments. As shown in FIG. 8, in some embodiments the ARIMA model builder 320 retrieves % usage time series data for a SSD (block 800). The ARIMA model builder 320 runs an Augmented Dickey Fuller (ADF) test on the % usage time series data to determine if the % usage time series is stationary (block 800). If the % usage time series is stationary (a determination of YES at block 810) the differencing term of the ARIMA model is zero (d=0) (block 815).

If the time-series is not stationary (a determination of NO at block 810) the ARIMA model builder 320 determines the minimum number of differencing needed to make the SSD usage time series stationary (block 815). In some embodiments, the differencing order is increased, for example to select a first order differencing, and a partial autocorrelation plot is generated based on the selected order of differencing (block 820). A determination is then made by the ARIMA model builder 320 as to whether the time-series is stationary, based on the currently selected order of differencing (block 835). If the time-series is not stationary (a determination of NO at block 835), the process returns to block 825 to select a higher level of differencing. Once a level of differencing is determined that makes the time-series sufficiently stationary (a determination of YES at block 835), the selected level of the differencing term of the ARIMA model is set to the selected level of differencing (d=differencing order where stationality is achieved).

The process also determines the AR term of the ARIMA model (block 845), where p=number of lags used by the ARIMA model to predict a future SSD % usage value. In some embodiments, the number of lags of the ARIMA model is selected by the ARIMA model builder 320 by determining the maximum number of lags where partial autocorrelation exceeds a threshold noise level.

The ARIMA model builder 320 also determines the MA term of the ARIMA model, where q=the number of error terms to be used by the ARIMA model (block 850). In some embodiments, a grid search is conducted using different number of q values, and the Akaike Information Criterion is used to determine the best q value for the ARIMA model.

The (p,d,q) terms of the ARIMA model are thus set (block 855) and the selected order ARIMA(p,d,q) is fit to the timeseries usage data for the SSD (block 860). In some embodiments, the ARIMA model order (p,d,q) information is stored in the ARIMA forecasting data structure 325, and optionally the learned coefficients may also be stored in the ARIMA forecasting data structure 325 (block 865).

Figure 9:
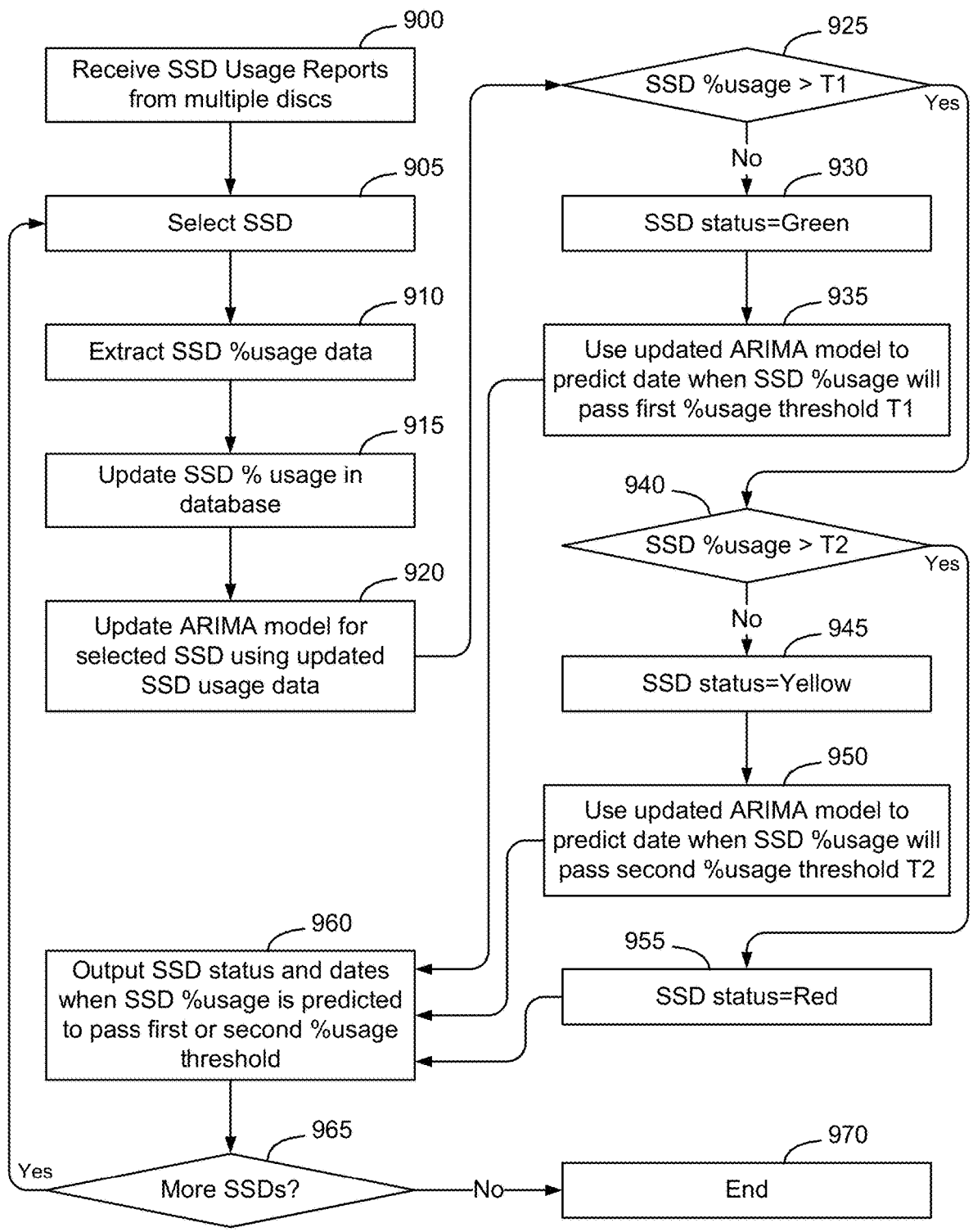
FIG. 9 is a flow chart of a process of using a set of trained ARIMA models to classify SSDs and predict future SSD usage threshold crossing events to plan for and procure replacement SSDs, according to some embodiments.

FIG. 9 is a flow chart of a process of using a set of trained ARIMA models by classifier 500 to classify SSDs and predict future SSD usage threshold crossing events, according to some embodiments. As shown in FIG. 9, when SSD usage reports are received (block 900), one of the SSDs is selected (block 905) and SSD usage data is extracted from the report (block 910). The SSD usage data for the SSD is updated in the database 315 (block 915) and the ARIMA model for the selected SSD is updated using the new data (block 920).

The current SSD % usage value is determined and compared against a first % usage threshold T1 (block 925). An example first % usage threshold T1 may be 5%, although other first thresholds may similarly be used. If the current SSD % usage value is below the first % usage threshold T1 (a determination of NO at block 925), the SSD status is set to a first value such as "green" (block 930). Other SSD status values may similarly be used. The updated ARIMA model is then used to predict the date when the SSD usage % will pass the first % usage threshold T1 (block 935). The SSD status (e.g., "green") and date when the SSD is predicted to exceed the first % usage threshold T1 are then output to the output subsystem 225 (block 960).

If the current SSD % usage value is greater than (or greater than or equal to) the first % usage threshold T1 (a determination of YES at block 925), the current SSD % usage value is determined and compared against a second % usage threshold T2 (block 940). An example second % usage threshold T2 may be 10%, although other second thresholds may similarly be used. If the current SSD % usage value is below the second % usage threshold T2 (a determination of NO at block 940), the SSD status is set to a second value such as "yellow" (block 945). Other SSD status values may similarly be used. The updated ARIMA model is then used to predict the date when the SSD usage % will pass the second % usage threshold T2 (block 950). The SSD status (e.g., "yellow") and date when the SSD is predicted to exceed the second % usage threshold T2 are then output to the output subsystem 225 (block 960).

If the current SSD % usage value is greater than (or greater than or equal to) the second % usage threshold T2 (a determination of YES at block 940), the SSD status is set to a third value such as "red" (block 945). Other SSD status values may similarly be used. Once the SSD has passed the second % usage threshold T2, it is not possible to repurpose the SSD. Optionally, the updated ARIMA model may be used to predict the date when the SSD usage % will reach another threshold, such as 95%. The SSD status (e.g., "red") is then output to the output subsystem 225 (block 960).

In addition to processing the selected SSD, a determination is made if there are additional SSDs to be processed (block 965). If there are additional SSDs (a determination of YES at block 965) the classifier 500 returns to block 905 where another SSD is selected, and an ARIMA model specific to that SSD is used to predict future % usage values for the SSD. Although FIG. 9 has been described in connection with processing individual SSDs in series (one after another), it should be understood that multiple SSDs may be individually processed in parallel as well, depending on the implementation.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of predicting future aggregate % usage levels of a plurality of each monitored Solid-State Drive (SSD) of a set of monitored SSDs to prevent the aggregate % usage levels of the monitored SSDs from exceeding a repurposing threshold, comprising:
   receiving % usage time series data from each of the monitored SSDs over a plurality of lags, each lag being an equal length of time;
   for each SSD:
      using the % usage time series data for the respective SSD to determine an order of an Auto Regression Integrated Moving Average (ARIMA) model type to be used to model the % usage time series data of the respective SSD, the determined order of the ARIMA model type being determined specifically for the respective SSD;
      fitting a respective ARIMA model of the determined ARIMA model type to the % usage time series data for the respective SSD to create an SSD specific ARIMA model for each respective SSD; and
      using the respective fit ARIMA model for the respective SSD in a predictive manner to forecast a first time when an expected aggregate % usage value of the respective SSD is likely to exceed a first % usage threshold value after which first forecast time the respective SSD will not able to be repurposed for another use.

2. The method of claim 1, further comprising, for each SSD, outputting a current % usage value for the respective SSD and the first forecast time when the expected aggregate % usage value of the respective SSD is likely to exceed the first % usage threshold value.

3. The method of claim 1, wherein receiving % usage time series data comprises periodically receiving % usage reports from each of the SSDs, converting the % usage reports into the % usage time series data for each of the SSDs, and storing the % usage time series data for each of the SSDs in a database.

4. The method of claim 1, wherein the monitored SSDs comprise groups of monitored SSDs, each group of monitored SSDs being physically located in a respective separate storage array.

5. The method of claim 1, wherein the ARIMA model type includes an Auto Regression (AR) term identifying a number of lagged values for the ARIMA model type, an Integration (I) term identifying an order of differencing for the ARIMA model type, and a Moving Average (MA) term identifying a number of lagged error values for the ARIMA model type.

6. The method of claim 5, wherein different ARIMA model types are determined for different SSDs.

7. The method of claim 5, wherein fitting the ARIMA model of the determined ARIMA model type comprises learning coefficients of the ARIMA model terms based on the % usage time series data for the respective SSD.

8. The method of claim 5, further comprising performing a partial autocorrelation for the % usage time series data of the respective SSD, and setting the AR term of the ARIMA model type equal to a number of lags where the partial autocorrelation for the % usage time series data exceeds a noise threshold.

9. The method of claim 5, further comprising running an Augmented Dickey Fuller test on the % usage time series data to determine if the % usage time series is stationary.

10. The method of claim 9, further comprising setting the Integration term to be greater than or equal to one when the % usage time series is not stationary.

11. The method of claim 5, further comprising performing a grid search to test multiple values for the MA term and using Akaike Information Criterion to select one of the tested values for the MA term of the ARIMA model type.

12. The method of claim 1, further comprising, for each SSD, using the fit ARIMA model for the respective SSD in a predictive manner to forecast a second time when the expected aggregate % usage value of the respective SSD is likely to exceed a second % usage threshold value, the second % usage threshold value being a lower % usage value than the first % usage threshold value.

13. The method of claim 12, further comprising, for each SSD, classifying a status of the respective SSD based on the second forecast time when the expected aggregate % usage value of the respective SSD is likely to exceed the second % usage threshold value, and the first forecast time when the expected aggregate % usage value of the respective SSD is likely to exceed the first % usage threshold value.

14. A Solid-State Drive (SSD) monitoring system, comprising:
 a data ingester configured to receive SSD % usage reports from each of a plurality of monitored SSDs over a plurality of lags, each lag being an equal length of time, and to build a respective % usage time series data for each of the plurality of monitored SSDs; and
 an analytics engine, the analytics engine containing control logic configured, for each SSD, to:
  use the % usage time series data for the respective SSD to determine an order of an Auto Regression Integrated Moving Average (ARIMA) model type to be used to model the % usage time series data of the respective SSD, the determined order of the ARIMA model type being determined specifically for the respective SSD;
  fit a respective ARIMA model of the determined ARIMA model type to the % usage time series data for the respective SSD to create an SSD specific ARIMA model for each respective SSD; and
  use the respective fit ARIMA model for the respective SSD in a predictive manner to forecast a first time when an expected aggregate % usage value of the respective SSD is likely to exceed a first % usage threshold value after which first forecast time the respective SSD will not able to be repurposed for another use, to prevent the aggregate % usage level of the respective SSD from exceeding a repurposing threshold.

15. The SSD monitoring system of claim 14, wherein the ARIMA model type includes an Auto Regression (AR) term identifying a number of lagged values for the ARIMA model type, an Integration (I) term identifying an order of differencing for the ARIMA model type, and a Moving Average (MA) term identifying a number of lagged error values for the ARIMA model type.

16. The SSD monitoring system of claim 14, wherein the control logic configured to use the % usage time series data for the respective SSD to determine an order of the ARIMA model type comprises control logic configured to:
 perform a partial autocorrelation of the % usage time series data of the respective SSD, and set the AR term of the ARIMA model type equal to a number of lags where the partial autocorrelation for the % usage time series data exceeds a noise threshold;
 run an Augmented Dickey Fuller test on the % usage time series data to determine if the % usage time series is stationary, and set the Integration term of the ARIMA model type to be greater than or equal to one when the % usage time series is determined to be not stationary; and
 perform a grid search to test multiple values for the MA term and use Akaike Information Criterion to select one of the tested values for the MA term of the ARIMA model type.

17. The SSD monitoring system of claim 14, wherein the control logic configured to fit the ARIMA model of the determined ARIMA model type comprises control logic configured to learn coefficients of the ARIMA model terms based on the % usage time series data for the respective SSD.

18. The SSD monitoring system of claim 14, wherein the control logic configured to use the fit ARIMA model for the respective SSD in a predictive manner further comprises control logic configured to use the fit ARIMA model for the respective SSD in a predictive manner to forecast a second time when the expected aggregate % usage value of the respective SSD is likely to exceed a second % usage threshold value.

19. The SSD monitoring system of claim 18, further comprising control logic configured to, for each SSD, classify a status of the SSD based on the second forecast time when the expected aggregate % usage value of the respective SSD is likely to exceed the second % usage threshold value, and the first forecast time when the expected aggregate % usage value of the respective SSD is likely to exceed the first % usage threshold value, the first % usage threshold value being a higher % usage value than the second % usage threshold value.

20. The SSD monitoring system of claim 19, further comprising control logic configured to, for each SSD: output the status of the respective SSD to a storage system management application; output a current % usage value for the respective SSD to the storage system management application; and output the first forecast time when the expected aggregate % usage value of the respective SSD is likely to exceed the first % usage threshold value, or the second forecast time when the expected aggregate % usage value of the respective SSD is likely to exceed the second % usage threshold value to the storage system management application.

* * * * *